(12) United States Patent
Son

(10) Patent No.: US 11,448,523 B2
(45) Date of Patent: *Sep. 20, 2022

(54) SENSOR DEVICE HAVING A ROTOR THAT INCLUDES A SLEEVE AND A MAGNET

(71) Applicant: LG INNOTEK CO., LTD., Seoul (KR)

(72) Inventor: Ho Chan Son, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 110 days.

This patent is subject to a terminal disclaimer.

(21) Appl. No.: 16/998,507

(22) Filed: Aug. 20, 2020

(65) Prior Publication Data

US 2020/0378795 A1 Dec. 3, 2020

Related U.S. Application Data

(63) Continuation of application No. 16/319,205, filed as application No. PCT/KR2017/007760 on Jul. 19, 2017, now Pat. No. 10,782,151.

(30) Foreign Application Priority Data

Jul. 19, 2016 (KR) .......................... 10-2016-0091478

(51) Int. Cl.
*G01D 5/14* (2006.01)
*G01D 11/16* (2006.01)
(Continued)

(52) U.S. Cl.
CPC ............... *G01D 5/14* (2013.01); *G01B 21/22* (2013.01); *G01D 11/16* (2013.01); *G01D 11/24* (2013.01); *G01L 3/00* (2013.01)

(58) Field of Classification Search
CPC ........... B60L 2240/421; B60L 2220/14; B60L 2240/429; B60L 2240/423;
(Continued)

(56) References Cited

U.S. PATENT DOCUMENTS 4,634,908 A 1/1987 Sturm
6,556,005 B1 4/2003 Oomkes
(Continued)

FOREIGN PATENT DOCUMENTS

CN 102593971 7/2012
CN 102759424 10/2012
(Continued)

OTHER PUBLICATIONS

International Search Report (with English Translation) and Written Opinion dated Oct. 18, 2017 issued in Application No. PCT/KR2017/007760.

(Continued)

*Primary Examiner* — Vinh P Nguyen

(74) *Attorney, Agent, or Firm* — Ked & Associates, LLP

(57) ABSTRACT

A sensor device may include a rotor, a stator disposed outside the rotor and a sensor module disposed outside the stator. The rotor may include a sleeve and a magnet coupled to the sleeve, and the magnet may be disposed inside the sleeve. The sleeve may include a fixing part which protrudes from an end of the sleeve and is in contact with the magnet. The sleeve includes a second body, and a third body. The second body is disposed to cover an upper surface of the magnet, and the third body is disposed to cover an outer circumferential surface of the magnet. The magnet is disposed between the shaft and the third body, thereby providing an advantageous effect of increasing a coupling force between the magnet of the rotor and a yoke.

14 Claims, 7 Drawing Sheets

(51) Int. Cl.
  *G01D 11/24* (2006.01)
  *G01B 21/22* (2006.01)
  *G01L 3/00* (2006.01)

(58) Field of Classification Search
  CPC ......... B60L 2240/441; B60L 2240/443; B60L 2220/50; B60L 58/40; B60R 16/027; B60R 16/033; B60R 16/0231; G05B 15/02; G05B 19/406; G05B 19/416; B60B 27/0068; B60B 27/06; G01H 1/003; G05D 17/02; G01P 3/487; G01P 3/488; G01P 3/443; G01P 3/489; G01P 3/44; G01P 13/04; G01P 1/04; G01P 3/42; G01P 1/08; G01P 1/11; G01P 3/22; G01P 3/48; G01P 13/045; G01P 21/02; G01P 3/46; G01P 3/4815; G01P 3/66; G01P 3/00; G01P 3/02; G01P 3/481; G01P 3/484; G01P 3/486; G01P 3/80; G01L 3/104; G01L 5/221; G01L 3/10; G01L 3/00; G01L 3/101; G01L 3/109; G01L 5/22; G01L 3/02; G01L 5/12; G01L 25/003; G01L 3/105; G01L 5/0042; G01L 25/00; G01L 3/04; G01L 3/08; G01L 3/108; G01L 5/0061; G01L 5/16; G01B 7/30; G01B 21/22; G01B 7/003; G01B 7/046; G01B 7/00; G01B 7/14; G01B 7/023; G01B 7/142; G01B 7/15; G01B 7/24; G01B 11/26; G01B 21/042; G01B 5/24; G01B 21/00; G01B 21/02
  See application file for complete search history.

(56) References Cited

U.S. PATENT DOCUMENTS

| | | | |
|---|---|---|---|
| 6,642,824 B2 | 11/2003 | Oomkes | |
| 7,370,853 B2 | 5/2008 | Urquidi | |
| 7,918,962 B2 | 4/2011 | Okui | |
| 8,375,810 B2* | 2/2013 | Bae | G01L 3/10 |
| | | | 73/862.334 |
| 8,482,177 B2* | 7/2013 | Kim | H02K 15/12 |
| | | | 310/156.08 |
| 8,584,532 B2 | 11/2013 | Lee | |
| 9,121,783 B2* | 9/2015 | Lee | G01L 3/104 |
| 9,810,592 B2* | 11/2017 | Lee | G01L 3/101 |
| 10,067,015 B2* | 9/2018 | Lee | G01L 3/10 |
| 10,267,692 B2* | 4/2019 | Son | G01L 3/101 |
| 10,782,151 B2* | 9/2020 | Son | G01D 5/145 |
| 2012/0266695 A1 | 10/2012 | Lee | |
| 2014/0070799 A1 | 3/2014 | Taniguchi et al. | |
| 2014/0306573 A1 | 10/2014 | Ikuta et al. | |
| 2016/0223361 A1 | 8/2016 | Rachui et al. | |
| 2017/0328737 A1 | 11/2017 | Sen et al. | |

FOREIGN PATENT DOCUMENTS

| | | |
|---|---|---|
| CN | 103683683 | 3/2014 |
| DE | 10 2007 050258 | 4/2009 |
| DE | 10 2013 015452 | 3/2015 |
| DE | 10 2014 018783 | 6/2016 |
| JP | 06-292333 | 10/1994 |
| JP | 2003-161640 | 6/2003 |
| JP | 2006-224574 | 9/2008 |
| JP | 2013-185923 | 9/2013 |
| KR | 10-1128608 | 3/2012 |
| KR | 10-2012-0120852 | 11/2012 |
| KR | 10-2015-0077562 | 7/2015 |

OTHER PUBLICATIONS

European Search Report dated Jan. 13, 2020 issued in Application No. 17831341.7.
Chinese Office Action dated Jul. 9, 2020 issued in Application No. 201780045179.4.
U.S. Notice of Allowance dated May 26, 2020 issued in U.S. Appl. No. 16/319,205.
Japanese Office Action dated Apr. 6, 2021 issued in Application No. 2019-502563.

* cited by examiner

SENSOR DEVICE HAVING A ROTOR THAT INCLUDES A SLEEVE AND A MAGNET

CROSS-REFERENCE TO RELATED PATENT APPLICATIONS

This application is a continuation application of U.S. patent application Ser. No. 16/319,205, filed Jan. 18, 2019, which is a U.S. National Stage Application under 35 U.S.C. § 371 of PCT Application No. PCT/KR2017/007760, filed Jul. 19, 2017, which claims priority to Korean Patent Application No. 10-2016-0091478, filed Jul. 19, 2016, whose entire disclosures are hereby incorporated by reference.

TECHNICAL FIELD

Embodiments relate to a sensor device.

BACKGROUND ART

An electric power steering (EPS) system secures turning stability and rapidly provides a restoring force by driving a motor using an electronic control unit (ECU) according to traveling conditions which are detected by a vehicle speed sensor, a torque angle sensor, a torque sensor so that a driver can safely travel.

The torque sensor, the angle sensor, or the torque angle sensor may include a rotor and a stator. The rotor includes a sleeve connected to a steering shaft of the vehicle. A magnet is attached to the sleeve. Here, the magnet is coupled to an outer side of the sleeve. Accordingly, the magnet is externally exposed. Therefore, there is a high risk of being damaged during an assembly process.

In addition, since the magnet is attached to the sleeve using an adhesive in a state in which the magnet is externally exposed, there is a problem in that the magnet is detached from the sleeve due to the damage of the magnet or incomplete curing of the adhesive.

DISCLOSURE

Technical Problem

The present invention is directed to providing a sensor device which prevents a magnet from being externally exposed.

In addition, the present invention is also directed to providing a sensor device in which a magnet is fixed to a sleeve without using an adhesive.

Objectives that have to be solved according to the embodiments are not limited to the above described objectives, and other objectives which are not described above will be clearly understood by those skilled in the art from the following specification.

Technical Solution

One aspect of the present invention provides a sensor device comprising a rotor, a stator disposed outside the rotor and a sensor module disposed outside the stator, wherein the rotor includes a sleeve and a magnet coupled to the sleeve, the magnet is disposed inside the sleeve, and the sleeve includes a fixing part which protrudes from an end of the sleeve and is in contact with the magnet, wherein the sleeve includes a second body, and a third body, wherein the second body is disposed to cover an upper surface of the magnet, the third body is disposed to cover an outer circumferential surface of the magnet, wherein the magnet is disposed between the shaft and the third body.

The fixed part is in contact with at least a part of the lower surface of the magnet.

The second body covers an upper surface of the magnet.

The third body covers an outer circumferential surface of the magnet.

The fixing part protrudes from a lower end of the third body.

The magnet includes a groove concavely formed on a lower surface of the magnet and the fixing part is coupled to the groove by caulking.

The groove includes an inner circumferential surface having an inner diameter which is greater than that of the magnet and the fixing part is coupled to the inner circumferential surface by caulking.

The fixing part includes a plurality of fixing parts and the plurality of the fixing parts are symmetrically disposed about a center of the sleeve.

An inner diameter of the magnet is greater than or equal to that of the first body.

The second body includes a serration in which a concave shape and a convex shape are repeated on an upper surface of the second body and which is engaged with an external device.

The sleeve includes a first body, wherein the second body connects the first body and the third body and has a shape of a step surface horizontally.

The sleeve includes a first body, wherein an inner diameter of the third body is greater than that of the first body.

The sleeve includes a first body, wherein an inner diameter of the magnet is greater than or equal to that of the first body.

The sleeve includes a first body, wherein the inner surface of the first body contacts a shaft.

Advantageous Effects

According to an embodiment, since a protrusion of a magnet is inserted into a hole of a yoke, there is an advantageous effect in that a coupling force between the magnet of a rotor and the yoke increases.

According to an embodiment, since the yoke is formed through a double injection after the sleeve and the magnet are aligned, there is an advantageous effect in that the number of components and manufacturing processes decreases.

According to an embodiment, since the sleeve and the yoke are integrated to form a core, and the magnet, a first shaft, and a second shaft are coupled to the core, there are advantageous effects in that the number of components decreases and that a cocenter of the components is easily maintained.

MODES OF THE INVENTION

Hereinafter, exemplary embodiments of the present invention will be described in detail with reference to the accompanying drawings. Objects, specific advantages, and novel features of the present invention will become more apparent from the detailed description and exemplary embodiments below related to the accompanying drawings. Also, the terms or words used in the present specification and the claims should not be limitedly interpreted in their general or dictionary meanings but, based on the principle that an inventor may properly define concepts of terms to describe his or her invention in the best possible way, should be interpreted in meanings and concepts in accordance with the technical idea of the present invention. In addition, in describing the present invention, detailed description of a known related art that may unnecessarily obscure the gist of the present invention will be omitted.

Figure 1:
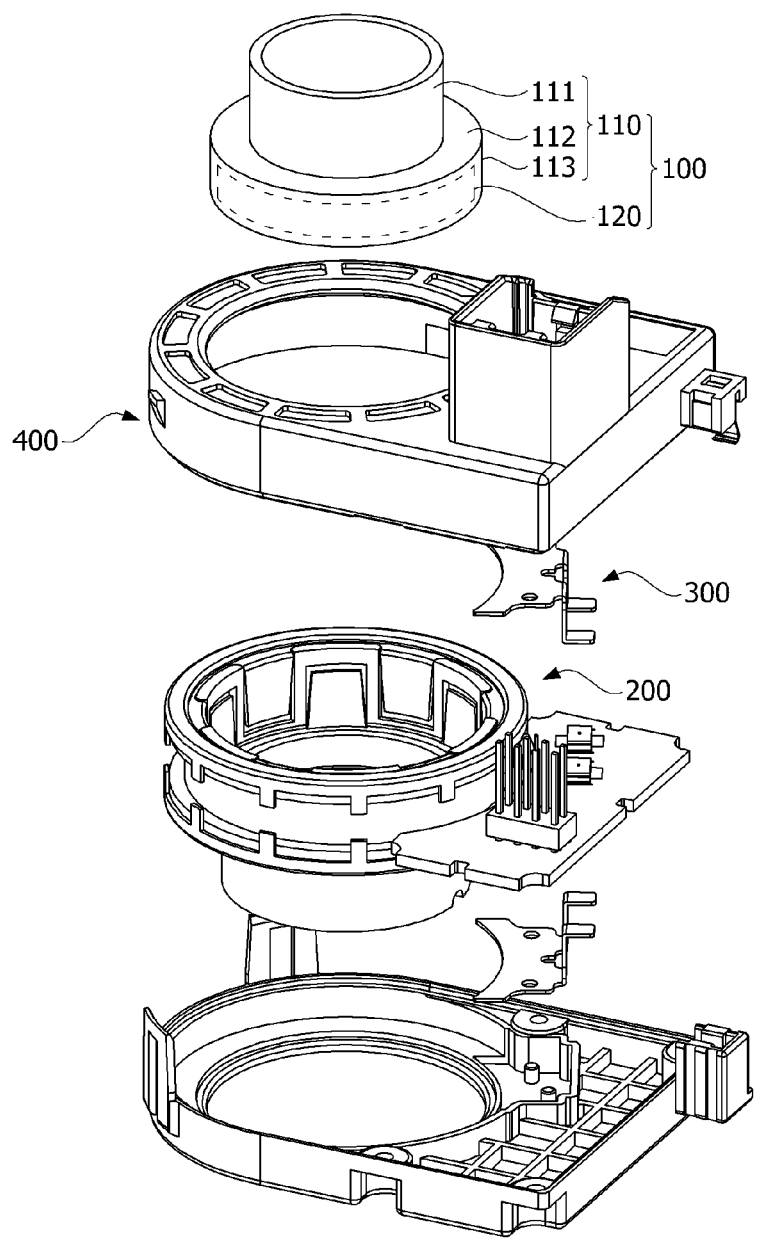
FIG. 1 is a view illustrating a sensor device according to an embodiment.

FIG. 1 is a view illustrating a sensor device according to an embodiment.

Referring to FIG. 1, the sensor device may include a rotor 100, a stator 200, and a sensor module 300.

The rotor 100 may include a sleeve 110 and a magnet 120.

The sleeve 110 may be a pipe-type member in which a space is formed.

A shaft may be connected to the sleeve 110. The shaft defined in the embodiment may be a steering input shaft connected to a handle of a vehicle or an output shaft connected to wheels of the vehicle. In addition, the sleeve 110 serves to surround the magnet 120 such that the magnet 120 is not externally exposed.

The magnet 120 is disposed inside the sleeve 110. In addition, the magnet 120 may have a ring shape.

The rotor 100 is disposed inside the stator 200. The rotor 100 rotates due to an interaction with the stator 200.

The stator 200 is disposed outside the rotor 100. The stator 200 may be disposed such that two stator rings face each other. In addition, two stator rings may be accommodated in a holder.

The sensor module 300 may be a torque sensor module, an angle sensor module, or a sensor module in which the torque sensor module and the angle sensor module are combined. The torque sensor module may include a magnetic element configured to measure a magnetic field generated between the rotor 100 and the stator 200, a collector configured to collect magnetic fields of the magnetic element and the stator rings, and the like. The magnetic field may be generated due to torsion of two shafts connected to the sensor device.

The angle sensor module may include a main gear which rotates in conjunction with the shaft and a sub-gear engaged with the main gear. The main gear may integrally rotate with the shaft. The magnet is installed on the sub-gear. The angle sensor module includes elements capable of measuring a magnetic field generated due to rotation of the magnet. The element may be one of an anisotropic magnetoresistance integrated circuit (AMRIC) and a Hall integrated circuit (IC).

A housing 400 accommodates the rotor 100, the stator 200, and the sensor module 300 thereinside.

Figure 2:
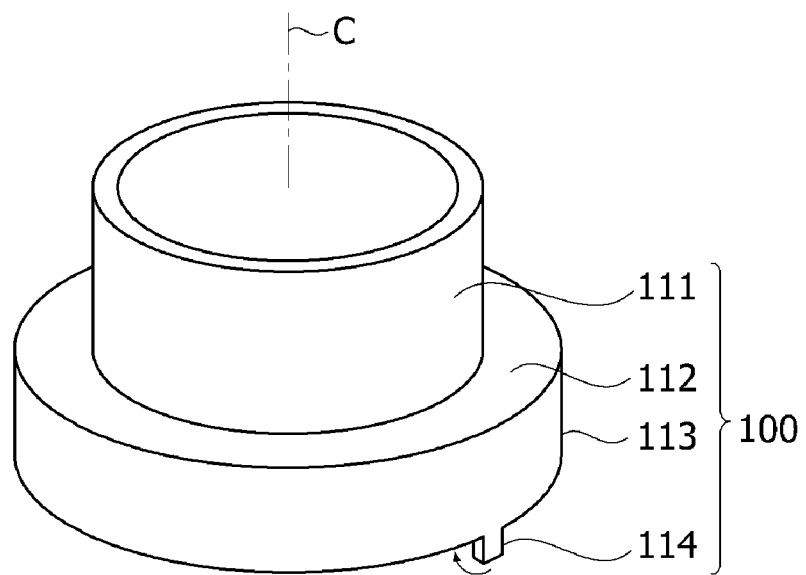
FIG. 2 is a view illustrating a rotor.
Figure 2:
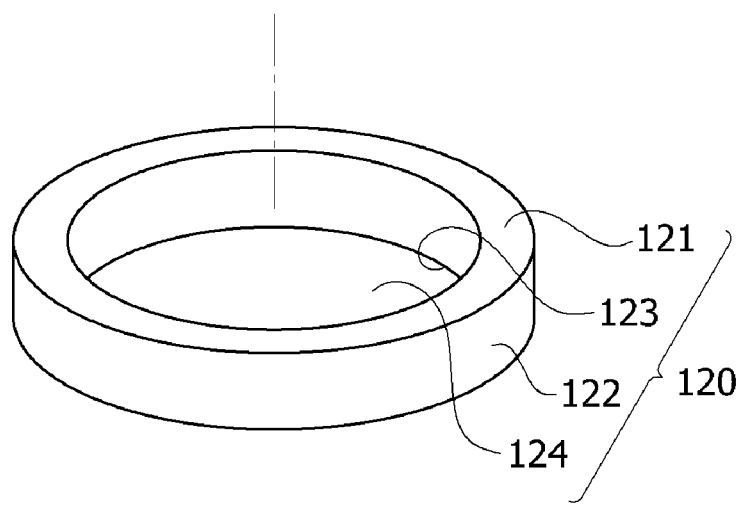
Figure 3:
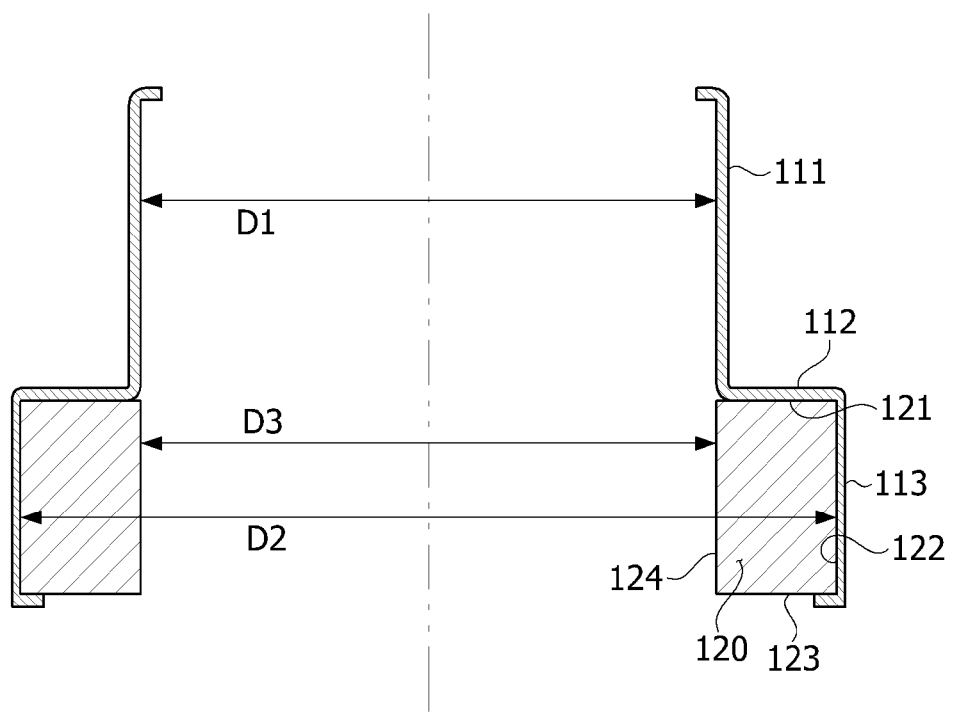
FIG. 3 is a cross-sectional view illustrating the rotor illustrated in FIG. 2.
Figure 4:
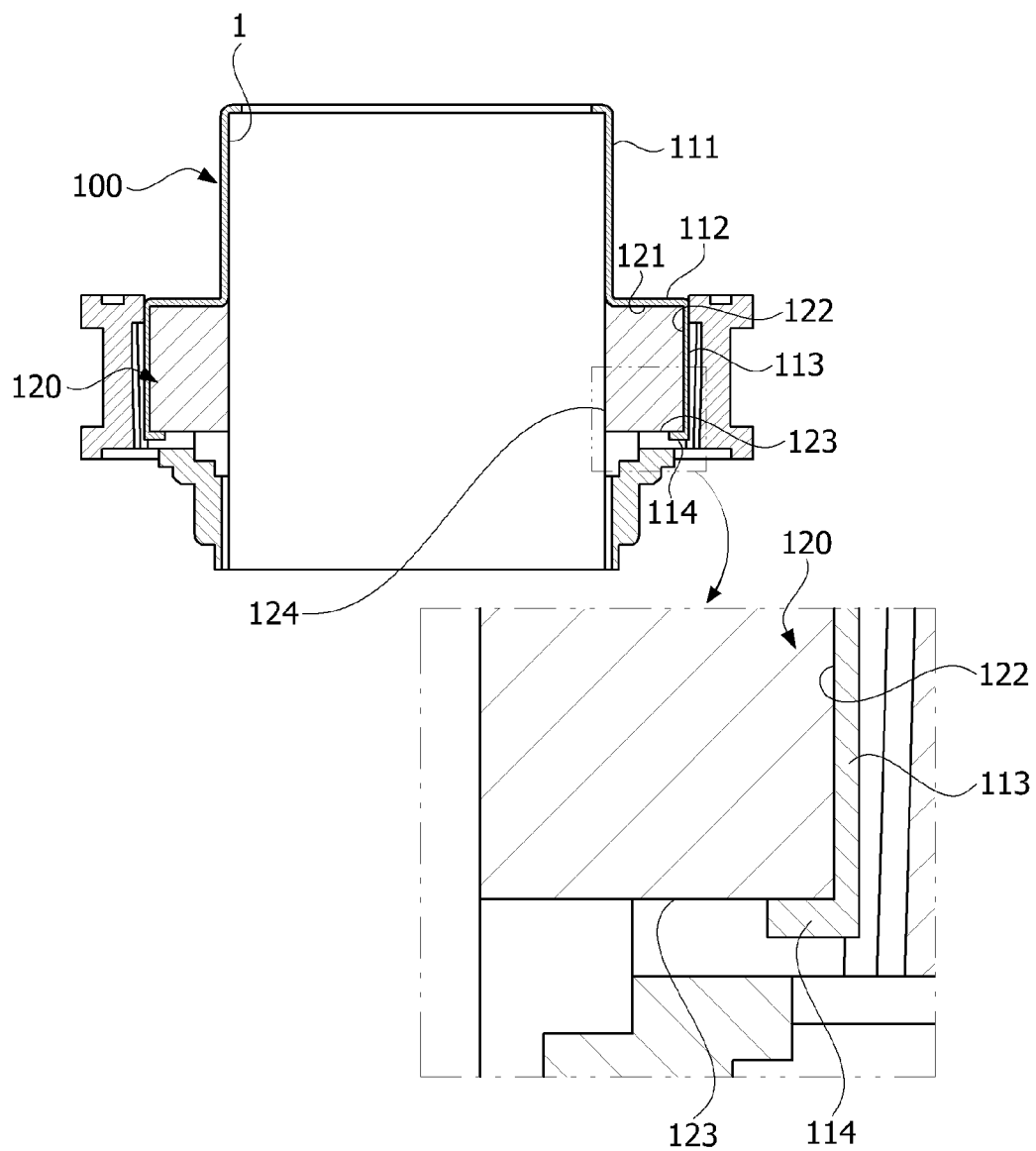
FIG. 4 is a view illustrating a fixing part coupled to a magnet.

FIG. 2 is a view illustrating the rotor, FIG. 3 is a cross-sectional view illustrating the rotor illustrated in FIG. 2, and FIG. 4 is a view illustrating a fixing part coupled to the magnet.

Referring to FIGS. 2 to 4, the magnet 120 of the rotor 100 of the sensor device according to the embodiment is disposed inside the sleeve 110, the sleeve 110 surrounds an outer side of the magnet 120, and an inner side of the magnet 120 surrounds a shaft 1 coupled to the sleeve 110. Accordingly, the magnet 120 is not externally exposed. Accordingly, the magnet 120 may be prevented from being damaged or detached due to an external force.

A specific configuration of the sleeve 110 for not externally exposing the magnet 120 will be described below.

The sleeve 110 may be divided into a first body 111, a second body 112, and a third body 113. The first body 111, the second body 112, and the third body 113 may only be individually described according to a shape and a functional property thereof and are connected as a single unit.

A diameter D1 of the first body 111 is less than a diameter D2 of the third body 113. The second body 112 connects the first body 111 and the third body 113. The second body 112 has a shape of a step surface horizontally formed due to a difference between the diameter D1 of the first body 111 and the diameter D2 of the third body 113.

The first body 111 is connected to the shaft 1.

A lower end of the second body 112 extends in a radius direction to cover an upper surface 121 of the magnet 120. The inner surface of the second body 112 may be in contact with the upper surface 121 of the magnet 120.

The third body 113 extends downward from an edge of the second body 112. In addition, the third body 113 covers an outer circumferential surface 122 of the magnet 120.

An inner diameter D3 of the magnet 120 may be greater than or equal to the inner diameter D1 of the first body 111. This is because the shaft 1 is coupled to the first body 111 and passes through the magnet 120.

Meanwhile, the sleeve 110 may include fixing parts 114. Parts of the third body 113 may extend to form the fixing parts 114. The fixing parts 114 may protrude from a lower end of the third body 113. The fixing parts 114 may be bent to be coupled to a lower end of the magnet 120 by caulking.

The plurality of fixing parts 114 may be provided. The plurality of fixing parts 114 may be positioned at every predetermined distance along a circumference of the lower end of the third body 113. Here, the plurality of fixing parts 114 may be symmetrically disposed about a circle center C (see FIG. 2) of the sleeve 110.

When the fixing part 114 physically fixes the magnet 120 to couple the magnet 120 to sleeve 110, the fixing part 114 may preclude use of an adhesive. Since the magnet 120 is coupled to the sleeve 110 without using the adhesive, the adhesive not curing may be prevented, or the magnet 120 may be prevented from being detached from the sleeve 110 due to an external force.

Figure 5:
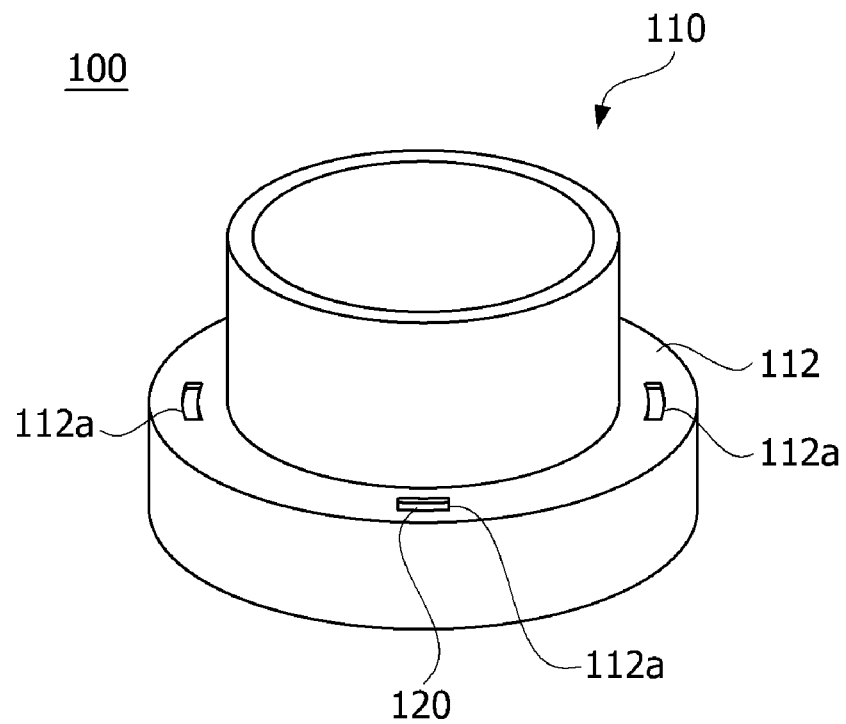
FIG. 5 is a view illustrating a hole formed in a sleeve.
Figure 6:
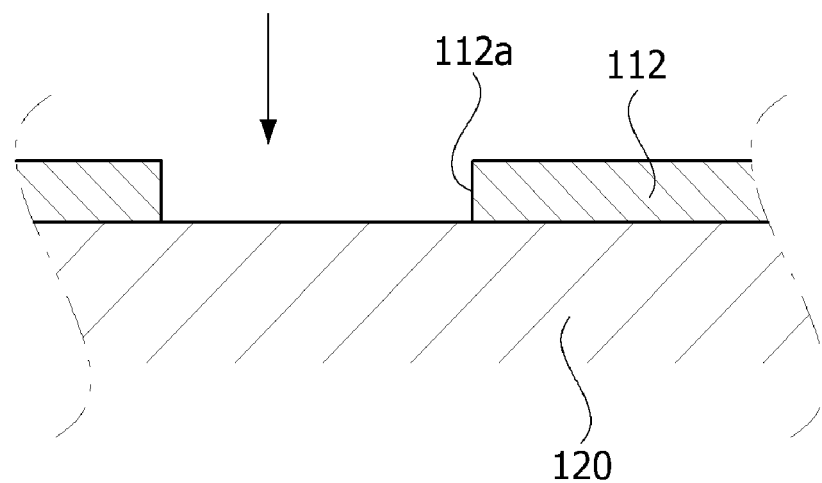
FIG. 6 is a cross-sectional view illustrating the hole illustrated in FIG. 5.

FIG. 5 is a view illustrating a hole formed in the sleeve, and FIG. 6 is a cross-sectional view illustrating the hole illustrated in FIG. 5.

Referring to FIGS. 5 and 6, holes 112a may be formed in the second body 112 of the sleeve 110. External devices may be inserted into the holes 112a in order to align a position of the rotor 100 in a rotation direction. When the external devices are inserted into the holes 112a and rotate, since the holes 112a are hooked on the external devices, the sleeve 110 rotates in conjunction with the external devices.

The plurality of holes 112a may be formed along the second body 112.

Figure 7:
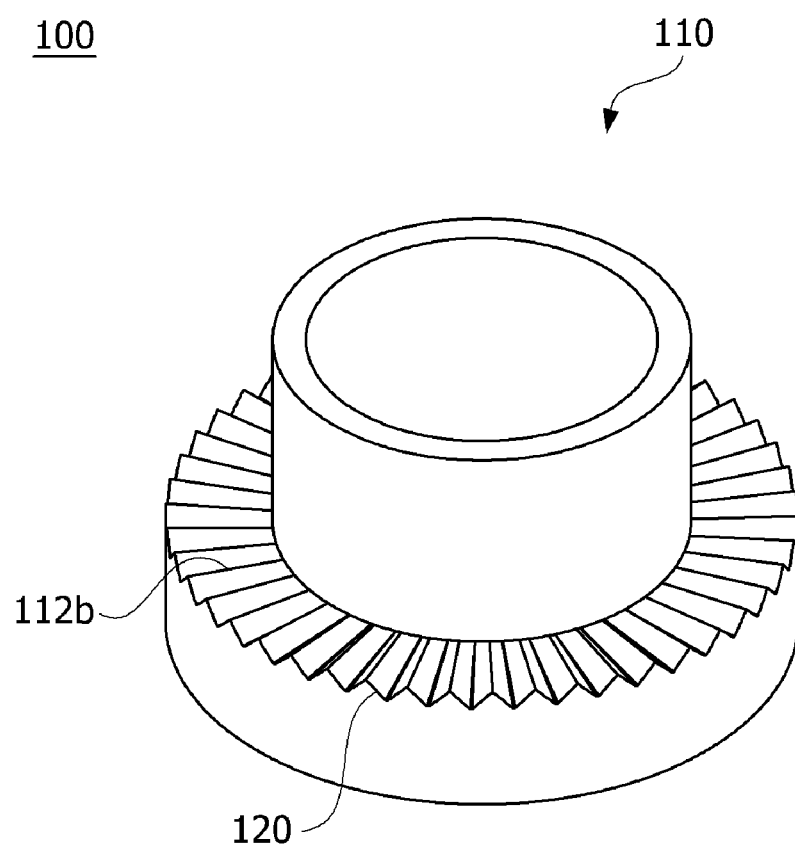
FIG. 7 is a view illustrating a serration formed on the sleeve.

FIG. 7 is a view illustrating a serration formed on the sleeve.

Referring to FIG. 7, a serration 112b may be formed on the second body 112 of the sleeve 110. The serration 112b may be formed to have repeating concave and convex shapes. For example, the serration 112b may be formed to have a repeating saw tooth shape on a surface of the second body 112. When an external device is in contact with the serration 112b, and the external device rotates, since the external device is hooked on the serration 112b, the sleeve 110 may rotate in conjunction with the external device.

Figure 8:
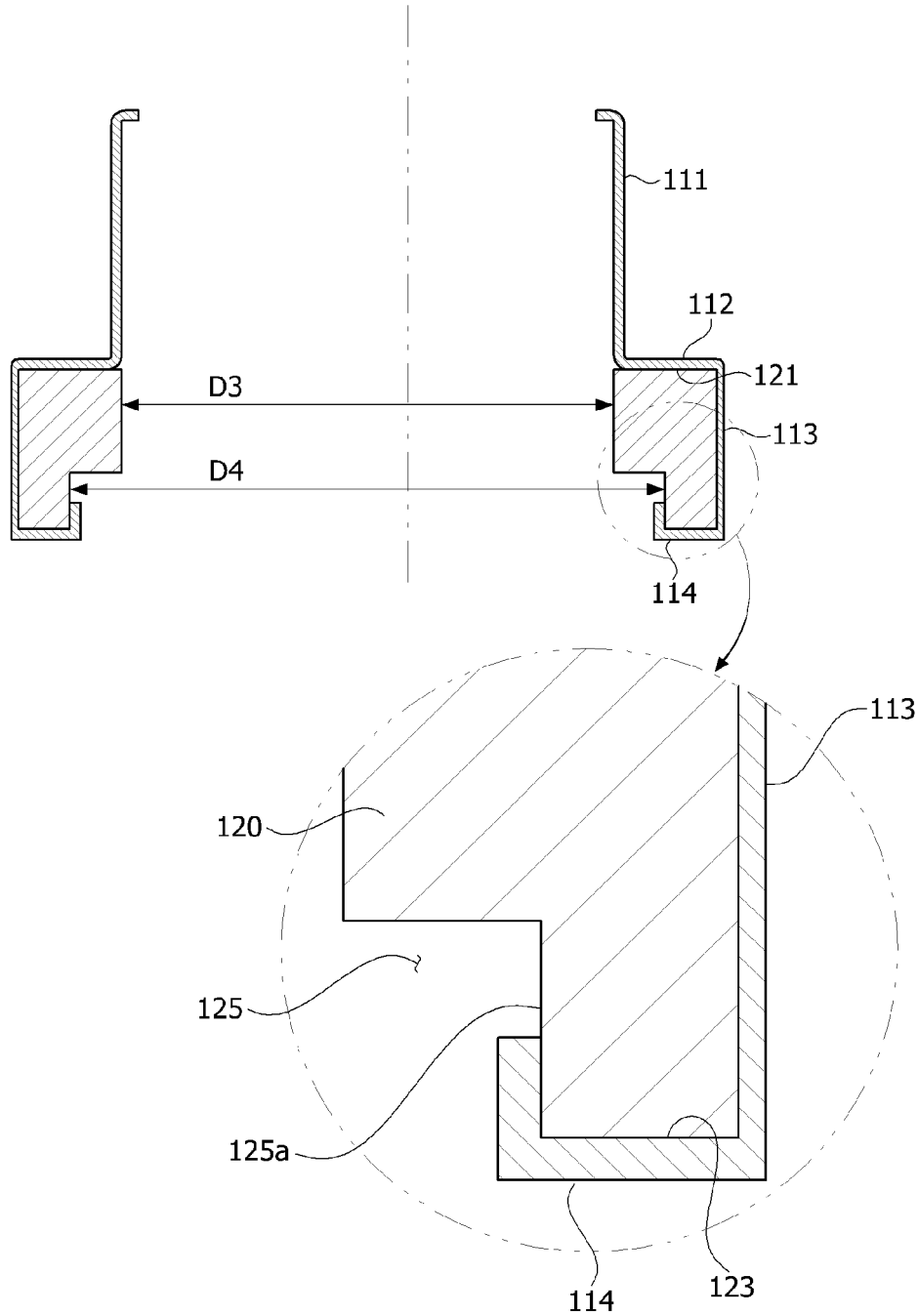
FIG. 8 is a view illustrating a groove of the magnet.

FIG. 8 is a view illustrating a groove of the magnet.

Referring to FIG. 8, the magnet 120 may include a groove 125 as a region at which the fixing parts 114 are caulked. The groove 125 may be concavely formed by cutting a part of the lower end of the magnet 120. Here, the groove 125 may be formed to have an inner circumferential surface 125a. An inner diameter D4 of the inner circumferential surface 125a may be greater than the inner diameter D3 of the magnet 120.

The fixing part 114 may cover a lower surface 123 of the magnet 120 and be bent toward the groove 125 to be caulked at the inner circumferential surface 125a. A structure of the groove 125 and the fixing parts 114 is a configuration capable of increasing a fixing force of the magnet 120. This is because the fixing parts 114 are coupled to the inner circumferential surface 125a in a state in which the fixing parts 114 cover all of the upper surface 121, the outer circumferential surface 122, and the lower surface 123 of the magnet 120.

As described above, the sensor device according to the embodiment has been described with reference to the accompanying drawings.

The above description is merely illustrative of the technical idea of the present invention. Those of ordinary skill in the art to which the present invention pertains should be able to make various modifications, changes, and substitutions within the scope not departing from essential characteristics of the present invention. Therefore, the embodiments disclosed herein and the accompanying drawings are for describing, instead of limiting, the technical idea of the present invention, and the scope of the technical idea of the present invention is not limited by the embodiments and the accompanying drawings. The scope of the present invention should be interpreted on the basis of the claims below, and all technical ideas within the equivalent scope should be interpreted as belonging to the scope of the present invention.

[Reference Numerals]

| | |
|---|---|
| 100: ROTOR | 110: SLEEVE |
| 111: FIRST BODY | 112: SECOND BODY |
| 112a: HOLE | 112b: SERRATION |
| 113: THIRD BODY | 114: FIXING PART |
| 120: MAGNET | 121: UPPER SURFACE |
| 122: OUTER CIRCUMFERENTIAL SURFACE | |
| 123: LOWER SURFACE | |
| 124: INNER CIRCUMFERENTIAL SURFACE | |
| 125: GROOVE | |
| 125a: INNER CIRCUMFERENTIAL SURFACE | |
| 200: STATOR | 300: SENSOR MODULE |
| 400: HOUSING | |

The invention claimed is:

1. A sensor device comprising:
a rotor;
a stator disposed outside the rotor; and
a sensor module disposed outside the stator,
wherein the rotor includes a sleeve and a magnet coupled to the sleeve, the magnet is disposed inside the sleeve, and the sleeve includes a fixing part which protrudes from an end of the sleeve and is in contact with the magnet,
wherein the sleeve includes a second body, and a third body,
wherein the second body is disposed to cover an upper surface of the magnet, the third body is disposed to cover an outer circumferential surface of the magnet,
wherein the magnet is disposed between a shaft and the third body.

2. The sensor device of claim 1, wherein:
the fixing part is in contact with at least a part of a lower surface of the magnet.

3. The sensor device of claim 1, wherein an inner surface of the second body and the upper surface of the magnet are in contact with each other.

4. The sensor device of claim 1, wherein the third body is in contact with the outer circumferential surface of the magnet.

5. The sensor device of claim 1, wherein the fixing part protrudes from a lower end of the third body.

6. The sensor device of claim 5, wherein:
the magnet includes a groove concavely formed on a lower surface of the magnet; and
the fixing part is coupled to the groove by caulking.

7. The sensor device of claim 6, wherein:
the groove includes an inner circumferential surface having an inner diameter which is greater than an inner diameter of the magnet; and
the fixing part is coupled to the inner circumferential surface by caulking.

8. The sensor device of claim 5, wherein:
the fixing part includes a plurality of fixing parts; and
the plurality of the fixing parts are symmetrically disposed about a center of the sleeve.

9. The sensor device of claim 1, wherein the second body includes a hole.

10. The sensor device of claim 1, wherein the second body includes a serration in which a concave shape and a convex shape are repeated on an upper surface of the second body and which is engaged with an external device.

11. The sensor device of claim 1,
wherein the sleeve includes a first body,
wherein the second body connects the first body and the third body and has a shape of a step surface horizontally.

12. The sensor device of claim 1,
wherein the sleeve includes a first body,
wherein an inner diameter of the third body is greater than an inner diameter of the first body.

13. The sensor device of claim 1,
wherein the sleeve includes a first body,
wherein an inner diameter of the magnet is greater than or equal to an inner diameter of the first body.

14. The sensor device of claim 1,
wherein the sleeve includes a first body,
wherein an inner surface of the first body contacts the shaft.

* * * * *